United States Patent [19]
Brookins

[11] Patent Number: 5,732,595
[45] Date of Patent: Mar. 31, 1998

[54] SLIDABLE TRANSMISSION SHAFT FOR A MANUAL TRANSMISSION

[76] Inventor: Ernie Brookins, 913 W. Main Ave., West Fargo, N. Dak. 58078

[21] Appl. No.: 650,712

[22] Filed: May 20, 1996

[51] Int. Cl.$^6$ .................................................. F16H 3/083
[52] U.S. Cl. ........................ 74/374; 74/362; 74/378; 192/21; 192/48.5; 192/48.91; 192/69.91
[58] Field of Search .......................... 74/361, 378, 379, 74/362, 363, 373, 374, 375; 192/21, 51, 48.5, 48.91, 69.91

[56] References Cited

U.S. PATENT DOCUMENTS

| | | |
|---|---|---|
| 1,320,911 | 11/1919 | Peterson .................................. 74/363 |
| 2,703,988 | 3/1955 | Stevens ........................... 192/69.91 X |
| 3,838,759 | 10/1974 | Schmoetz et al. ............... 192/69.91 X |
| 3,890,850 | 6/1975 | Hauser et al. ..................... 192/48.91 X |
| 3,982,443 | 9/1976 | Fitch .................................. 192/69.91 X |
| 4,482,039 | 11/1984 | Harris ................................... 192/69.91 |

FOREIGN PATENT DOCUMENTS 155733   1/1952   Australia .................................. 74/378

*Primary Examiner*—Allan D. Herrmann
*Attorney, Agent, or Firm*—David A. Lingbeck

[57] ABSTRACT

A slidable transmission shaft for a manual transmission includes a plurality of closely-spaced splines at a second end, a first plurality of keys at a first end, which are slidably engagable to an impeller fastened to the crankshaft of a motor vehicle for high gear, and a second plurality of keys spaced from the first plurality of keys and which are slidably engagable to a clutch for low gear. This slidable transmission shaft can also achieve reverse by sliding into a position where neither of the plurality of keys are engaged.

11 Claims, 2 Drawing Sheets

5,732,595

SLIDABLE TRANSMISSION SHAFT FOR A MANUAL TRANSMISSION

BACKGROUND OF THE INVENTION

This invention relates to a slidable transmission shaft for a manual transmission primarily used on stock race cars driven on an oval track.

Typically, manual transmissions have more than one shaft which are engaged by clutches that are slidable upon the shafts when the gears are being shifted.

One known prior art is a MANUAL TRANSMISSION OF A MOTOR VEHICLE, U.S. Pat. No. 5,392,665, which comprises an input and an output shaft, transmission gears situated between the two shafts, and a pair of synchronizer clutches which have sleeves that slide upon the shafts when the transmission is being shifted.

None of the prior art discloses a transmission having a single slidable elongate shaft which gets reverse, low gear, and high gear without there being at least two shafts.

SUMMARY OF THE INVENTION

The present invention relates to a slidable transmission shaft for a manual transmission comprising an elongate shaft having a first end engaged to the drive shaft of a motor vehicle and a second end which is slidably engageable to the crankshaft of the engine and to the clutch, and further having a recessed portion at the second end of the shaft with a plurality of splines longitudinally-disposed on the recessed portion of the second end which is engaged to mating splines on the drive shaft of a motor vehicle. The elongate shaft also has a first plurality of keys longitudinally-disposed and circumferentially-spaced about the shaft at the first end thereof for engaging an impeller fastened to the crankshaft and has a second plurality of keys which are axially spaced from the first plurality of keys near the first end of the elongate shaft and which are longitudinally-disposed and circumferentially-spaced about a portion of the elongate shaft, for engaging a clutch which is engaged by the impeller fastened to the crankshaft. The elongate shaft is slidable relative to the clutch and to the impeller.

One objective of the present invention is to provide a single slidable transmission shaft for a manual transmission which is slidable relative to the crankshaft and to the clutch for changing gears and for shifting directions.

Another objective of the present invention is to provide a slidable transmission shaft for a manual transmission which is used to get two forward gears and reverse.

Further objectives and advantages of the present invention will become apparent as the description proceeds and when taken in conjunction with the accompanying drawings wherein:

DETAILED DESCRIPTION OF THE INVENTION

Figure 1:
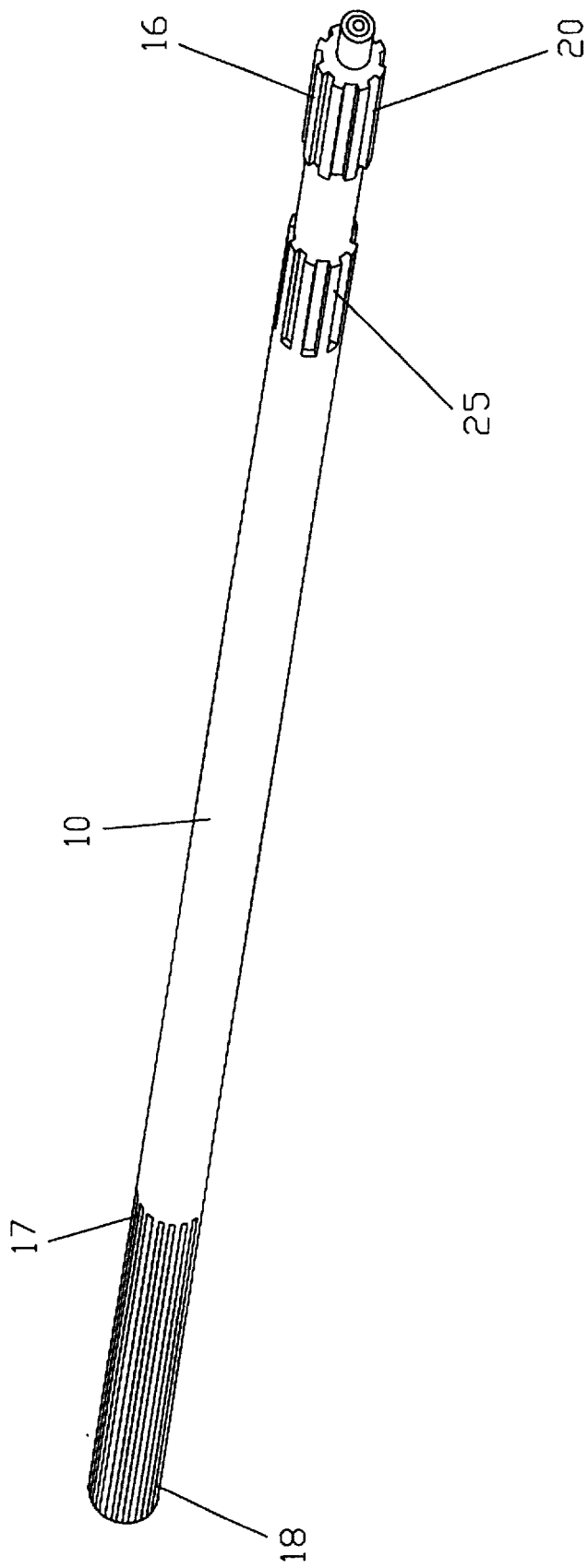
FIG. 1 is a perspective view of the slidable transmission.
Figure 2:
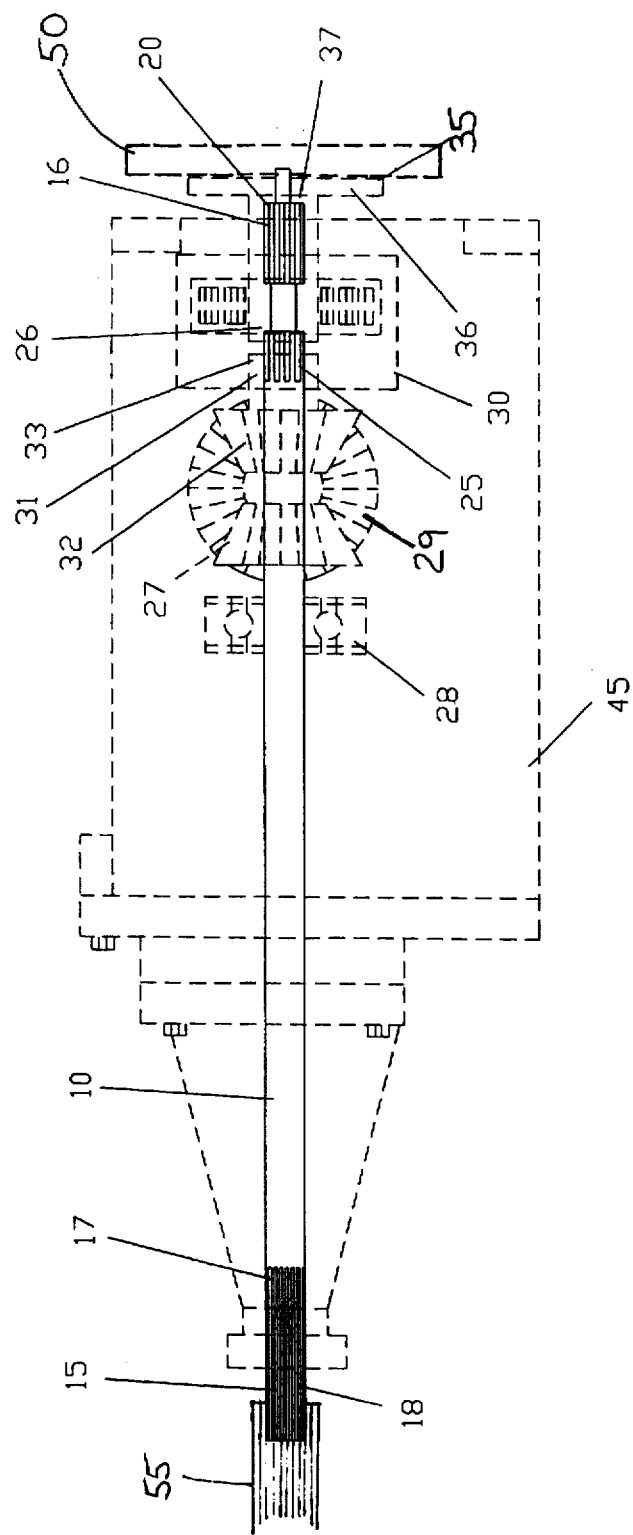
FIG. 2 is a side elevation view of the slidable transmission in cooperation with other components of a manual transmission.

Referring to the drawings in FIGS. 1 & 2, the slidable transmission shaft for a manual transmission comprises an elongate shaft 10 having a rounded cross section and having a first end 15 and a second end 16 with the elongate shaft 10 having a recessed portion 17 extending along a portion of the shaft 10 from the first end 15 thereof. A plurality of closely-spaced splines 18 are circumferentially spaced about the recessed portion 17 of the shaft 10 and extend longitudinally along the elongate shaft 10 in the recessed portion 17 and are engageable to the drive shaft 55 of a motor vehicle. As the transmission shaft 10 rotates, the plurality of splines 18 in the recessed portion 17 engages a plurality of mating splines on the drive shaft 55 and rotates the drive shaft 55 which puts the motor vehicle into motion.

The transmission shaft 10 also has a first plurality of keys 20 which are circumferentially and widely spaced about the elongate shaft 10 at the second end 16 thereof to substantially withstand the torque placed upon the first plurality of keys 20 as the elongate shaft 10 rotates, and extend a short distance along a portion of the elongate shaft 10, the length of the first plurality of keys 20 being substantially less than that of the length of the plurality of splines 18 in the recessed portion 17 of the elongate shaft 10 and being slightly longer than a plurality of keyways into which the first plurality of keys 20 are slidably engageable to put the motor vehicle into high gear. The length of the first plurality of keys 20 determines how far the transmission shaft 10 has to slide to engage and disengage the plurality of keyways which are circumferentially spaced about the interior of an impeller 35 which is fastened with bolts to the crankshaft 50 of the engine.

The transmission shaft 10 further has a second plurality of keys 25 having lengths which are substantially equal to the lengths of the first plurality of keys 20 and being circumferentially and widely spaced about a portion of the elongate shaft 10 to substantially withstand the torque placed upon the second plurality of keys 25 as the elongate shaft 10 rotates and further being spaced apart from the first plurality of keys 20, the space between the first 20 and second plurality of keys 25 being approximately the lengths of either plurality of keys 20,25. The second plurality of keys 25 are slidably engageable with a plurality of keyways which are circumferentially spaced about the interior of a tubular gear support member 31 which rotatably extends into the housing 30 of the clutch 26, to put the motor vehicle into low gear.

The slidable transmission shaft 10 is journaled through a bearing 28 which supports the elongate shaft 10 inside a transmission housing 45. The elongate shaft 10 slidably extends through the clutch housing and through the tubular gear support member 31 and further slidably extends through the impeller 35 which has a collar 36 that is fastened to the crankshaft 55, and which has a tubular portion 37 which is engaged to gears inside the clutch housing 30. The bearing 28 which supports the elongate shaft 10 is connected to conventional linkages which are pivotally connected to the transmission housing 45 and to a conventional shifting mechanism which allows the user to slide the elongate shaft 10 inside the transmission housing 45 and to shift the transmission into either reverse, low gear, or high gear.

For reverse, the elongate shaft 10 is moved so that none of the first and second plurality of keys 20,25 are engaged to either the impeller 35 or the clutch 26, and a first bevel gear 27 which is mounted about a medial portion of the elongate shaft 10 engages a second bevel gear 29 which is movably suspended inside the transmission housing 45 and which engages a third bevel gear 32 which is mounted at an end of the tubular gear support member 31, all of which reverses the rotation of the elongate shaft 10. If the user wants to shift the transmission into low gear from reverse, the user moves the conventional shifting mechanism such that the second bevel gear 29 is disengaged from the first 27 and third bevel gears 32 and the elongate shaft 10 is moved toward the crankshaft 50 until the second plurality of keys 25 are engaged with the plurality of keyways in the clutch housing 30. If the user wants to shift to high gear, the user again moves the conventional shifting mechanism such that the elongate shaft 10 is moved farther toward the crankshaft 50 such that the first plurality of keys 20 are now engaged with the impeller 35. Because of these unique keys, the user can get reverse, low gear, and high gear all from just this one elongate shaft 10.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A slidable transmission shaft for a manual transmission comprising:

an elongate shaft having a first end and a second end and further having a recessed portion extending along a portion of said elongate shaft from said second end, said elongate shaft also having a plurality of splines circumferentially spaced about said recessed portion and being engaged to a drive shaft of a motor vehicle, said elongate shaft further having a first plurality of keys circumferentially spaced about a portion of said elongate shaft at about said first end thereof and being slidably engagable to an impeller fastened to a crankshaft of said motor vehicle.

2. A slidable transmission shaft for a manual transmission as described in claim 1, wherein said first plurality of keys are longitudinally disposed and widely spaced upon said elongate shaft to substantially withstand the torque exerted upon said first plurality of keys as said elongate shaft rotates.

3. A slidable transmission shaft for a manual transmission as described in claim 2, wherein said first plurality of keys have lengths slightly longer than lengths of keyways in said impeller fastened to a crankshaft of a motor vehicle and into which said first plurality of keys are slidably engagable such that the distance said elongate shaft moves is generally determined by said lengths of said first plurality of keys.

4. A slidable transmission shaft for a manual transmission as described in claim 3, wherein said first plurality of keys when engaged to said impeller places said manual transmission in high gear.

5. A slidable transmission shaft for a manual transmission as described in claim 4, wherein said elongate shaft further includes a second plurality of keys circumferentially spaced about a portion of said elongate shaft and being spaced from said first plurality of keys and being slidably engagable to a clutch.

6. A slidable transmission shaft for a manual transmission as described in claim 5, wherein said second plurality of keys are longitudinally disposed and widely spaced upon said elongate shaft to substantially withstand the torque exerted upon said second plurality of keys as said elongate shaft rotates.

7. A slidable transmission shaft for a manual transmission as described in claim 6, wherein said second plurality of keys are spaced from said first plurality of keys.

8. A slidable transmission shaft for a manual transmission as described in claim 7, wherein said second plurality of keys have lengths generally equal to the lengths of said first plurality of keys for determining the distance said elongate shaft needs to move to change gears or change the direction of rotation.

9. A slidable transmission shaft for a manual transmission as described in claim 8, wherein said second plurality of keys are adapted to slidably engage a clutch to place said manual transmission into low gear.

10. A slidable transmission shaft for a manual transmission as described in claim 7, wherein said space between said first plurality of keys and said second plurality of keys is generally equal to the lengths of either plurality of keys.

11. A slidable transmission shaft for a manual transmission as described in claim 10, wherein said space separates said second plurality of keys from said first plurality of keys and is adapted to allow said elongate shaft to be moved such that neither of said plurality of keys are engaged and to allow said manual transmission to be placed in reverse.

* * * * *